(12) United States Patent
Ramirez Gonzalez et al.

(10) Patent No.: US 9,776,278 B2
(45) Date of Patent: Oct. 3, 2017

(54) LASER WELDER ALIGNMENT SYSTEM

(71) Applicant: Abbott Cardiovascular Systems, Inc., Santa Clara, CA (US)

(72) Inventors: Esteban V. Ramirez Gonzalez, La Guacima (CR); Francisco J. Eugenin Hernandez, San Rafael (CR)

(73) Assignee: ABBOTT CARDIOVASCULAR SYSTEMS, INC., Santa Clara, CA (US)

( * ) Notice: Subject to any disclaimer, the term of this patent is extended or adjusted under 35 U.S.C. 154(b) by 251 days.

(21) Appl. No.: 14/813,085

(22) Filed: Jul. 29, 2015

(65) Prior Publication Data

US 2017/0028506 A1 Feb. 2, 2017

(51) Int. Cl.
*B23K 26/04* (2014.01)
*B23K 26/03* (2006.01)
*B23K 26/70* (2014.01)
*G06F 21/31* (2013.01)

(52) U.S. Cl.
CPC .......... *B23K 26/043* (2013.01); *B23K 26/032* (2013.01); *B23K 26/70* (2015.10); *G06F 21/31* (2013.01)

(58) Field of Classification Search
USPC ............. 219/121.62, 121.67, 121.72, 121.83
See application file for complete search history.

(56) References Cited

U.S. PATENT DOCUMENTS

2005/0253447 A1* 11/2005 Abe ...................... B21D 53/30
 301/95.108

* cited by examiner

*Primary Examiner* — Samuel M Heinrich
(74) *Attorney, Agent, or Firm* — Workman Nydegger; Ron Devore

(57) ABSTRACT

A laser welder alignment system includes a laser welder, a camera associated with the laser welder configured to capture images of a loaded product within the laser welder, and a controller in communicative association with the laser welder and the camera. The controller receives visualization data from the camera and, based on the visualization data, forms and sends positioning instructions to the laser welder instructing the laser welder so as to position the loaded product at a proper weld start. The laser welder alignment system also verifies proper positioning of the loaded product within the laser welder, and verifies proper rotation of the loaded component by determining whether the rotating product has a wobble that exceeds a pre-defined wobble tolerance.

20 Claims, 6 Drawing Sheets

LASER WELDER ALIGNMENT SYSTEM

CROSS-REFERENCE TO RELATED APPLICATIONS

N/A

BACKGROUND

The present disclosure relates generally to systems, devices, and methods for automated alignment of a product in a laser welding process. In many instances, the joining together of separate components of a product, such as a balloon catheter or other medical device, is accomplished using a laser welding process. Typically, the product or product components to be welded are loaded into a laser welder apparatus, after which an operator manually aligns and adjusts the product within the laser welder and visually verifies the positioning of the product before initiating laser welding of the product.

While such a process can be useful, the necessary use of an operator to manually adjust and position the product within the laser welder consumes operator/employee time and introduces undesirable variability into the process. In addition, the required operator-controlled steps can often represent process bottlenecks that slow a manufacturing process and decrease productivity. Such limitations result in increased manufacturing time and expenses, and a higher proportion of parts that must be reprocessed or scrapped.

For at least these reasons, there is an ongoing need to provide alternative and/or additional systems, devices, and methods for laser welding products, such as medical device products. Such systems, devices, and methods should be able to efficiently align parts within the laser welder and verify that relative positioning and movement of parts are within process parameters. At least some of the embodiments disclosed below are directed toward these objectives.

BRIEF SUMMARY

The present disclosure relates to systems and methods in which a target product can be automatically visualized and automatically positioned within a laser welder as part of a laser welding process. One or more embodiments are directed to a laser welder alignment system, including a laser welder; a camera associated with the laser welder and configured to capture visualization data from the laser welder; and a controller in communicative association with the laser welder and the camera, the controller being configured to receive visualization data from the camera, translate the visualization data into positioning instructions readable by the laser welder at least by identifying a shortest trim of an overlapping portion of the loaded product, and send the positioning instructions to the laser welder, the positioning instructions instructing the laser welder to position a loaded product within the laser welder at a proper welding position relative to the identified shortest trim of the overlapping portion.

One or more embodiments are directed to a laser welder alignment system including a laser welder having a plurality of laser welder components; a camera associated with the laser welder and configured to capture visualization data from the laser welder; and a controller in communicative association with the laser welder and the camera, the controller being configured to receive visualization data from the camera, translate the visualization data into positioning instructions readable by the laser welder at least by identifying a shortest trim of an overlapping portion of the loaded product, and send the positioning instructions to the laser welder, the positioning instructions instructing the laser welder to align the loaded product at the proper welding position relative to the identified shortest trim of the overlapping portion; wherein the controller is also configured to verify alignment and proper rotation of the loaded product by receiving alignment verification data from the camera and, based on the alignment verification data, determine whether the loaded product is positioned at the proper welding position and has a wobble that is within a predefined tolerance range.

One or more embodiments are directed to a method, implemented at a computer system that includes one or more processors, the computer system being communicatively coupled to a laser welder and a camera, of positioning a weldable product within a laser welder, the method including: receiving visualization data from a camera, the visualization data representing images of a loaded product within the laser welder; based on the visualization data received from the camera, formulating positioning instructions based at least on an identified shortest trim of an overlapping portion of the loaded product; and sending the positioning instructions to the laser welder, the positioning instructions instructing the laser welder how to position one or more laser welder components so as to align the loaded product at a proper welding position relative to the identified shortest trim.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only illustrated embodiments of the disclosure and are therefore not to be considered limiting of its scope. Embodiments of the disclosure will be described and explained with additional specificity and detail through the use of the accompanying drawings in which.

DETAILED DESCRIPTION

The present disclosure relates to systems and methods in which a target product can be automatically visualized and automatically positioned within a laser welder as part of a laser welding process. For example, one or more embodiments of the present disclosure relate to the automatic aligning of separate components of a target product, such as a balloon catheter or other medical device in a laser welding process.

Figure 1A:
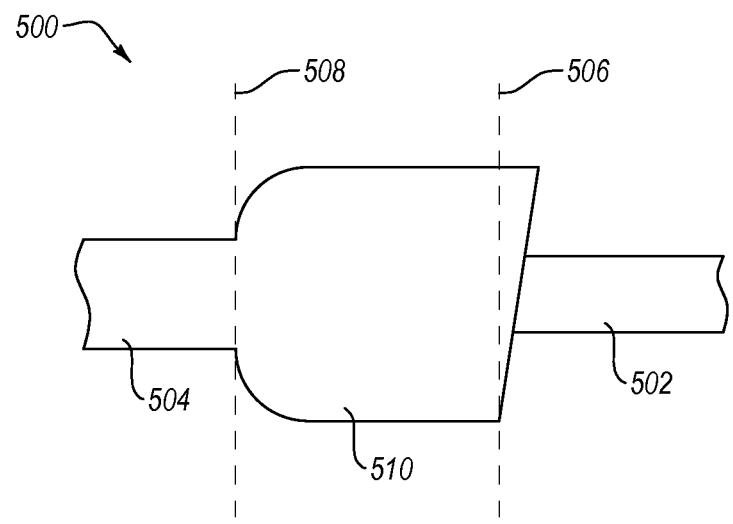
FIGS. 1A and 1B illustrate an embodiment of aligning a loaded product within a laser welder according to one embodiment of the present disclosure.
Figure 1B:
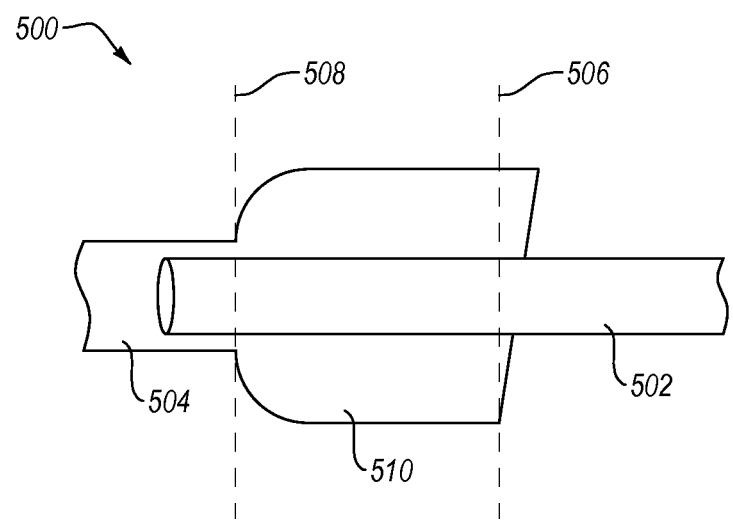

FIGS. 1A and 1B illustrate an embodiment of a loaded product 500 loaded into a laser welder alignment system of the present disclosure, with FIG. 1A showing an outer section 504 positioned around an inner section 502, and FIG. 1B showing a cutout of the outer section 504 so as to illustrate the extension of the inner section 502 within the outer section 504. As described in greater detail below, the illustrated loaded product 500 can be positioned within the laser welder according to process 300 illustrated in FIG. 4 and/or process 400 illustrated in FIG. 5, for example. To form a suitably strong bond between inner section 502 and outer section 504, it can be important for the bond or laser weld to be formed over a predetermined minimum length. Inasmuch as outer section 504 may not always be formed, cut or otherwise terminated in such a way that the distal end is exactly perpendicular to the longitudinal axis, it can also be advantageous to determine the shortest point presented by the distal end of outer section 504, which may sometimes be referred to hereinafter as the "point of shortest trim" or "shortest trim."

Products suitable for being laser welded according to the present disclosure include devices, such as medical devices, having one or more outer sections or lumens and one or more inner sections or lumens to be joined at one or more areas. For example, joining a balloon to a tube section to form a balloon catheter, or joining an outer catheter section to an inner catheter section.

A laser welder alignment system can position the loaded product 500 illustrated in FIGS. 1A and 1B by using a camera (such as camera 120 illustrated in FIG. 2) to capture images of the loaded product 500. The visualization data can be sent to a controller (such as controller 130 illustrated in FIG. 2), where it can be interpreted. For example, the controller can determine a point of shortest trim of the outer section 504, and can formulate an alignment position based on the shortest trim as illustrated by line 506. Additionally, or alternatively, the controller can determine a point on the outer section 504 that defines an overlapping portion 510 of the outer section 504, and can formulate an associated alignment position as illustrated by line 508.

In some embodiments, based on the identification of the shortest trim of the overlapping portion 504 and the determination of line 506, the controller can formulate positioning instructions directing one or more laser welder components to adjust position in order to properly orient line 506 relative to the beam path of the laser and bring the loaded product 500 to a corresponding weld start position. For example, the loaded product 500 can be brought to a weld start position where the beam path of the laser is directly in line with line 506.

In other embodiments, the loaded product 500 can be brought to a weld start position where the beam path of the laser is offset a pre-selected distance from line 506 (e.g., offset toward line 508). For example, for a given desired weld area length (e.g., 0.25 to 5 mm, or 0.5 to 2.5 mm, or 0.75 to 1.5 mm, or about 1 mm), the offset from line 506 toward line 508 can be pre-selected as approximately half the desired weld area length. In this manner, as heat from the laser conducts through the loaded product and forms the weld, the weld can move outwardly from the weld start position to cover or substantially cover the area between lines 506 and 508.

In other embodiments, the loaded product 500 can be brought to a weld start position where the beam path of the laser is offset from line 506 by an automatically determined distance. For example, in embodiments where the controller determines a line 506 and a line 508, the offset can be automatically determined by the controller so as to position the weld start approximately half way between lines 506 and 508.

These and other embodiments described herein provide a number of advantages and benefits. For example, aligning a weld start in relation to a shortest trim can more efficiently focus welding time and/or power on areas of the loaded product where the outer section 504 completely overlaps the inner section 502 (e.g., as opposed to areas of longer trim of the outer section 504 which do not completely circumferentially overlap the inner section 502). In this manner, all or most of the resulting weld can be formed at areas of the loaded product 500 having full circumferential contact between the welded components.

Figure 2:
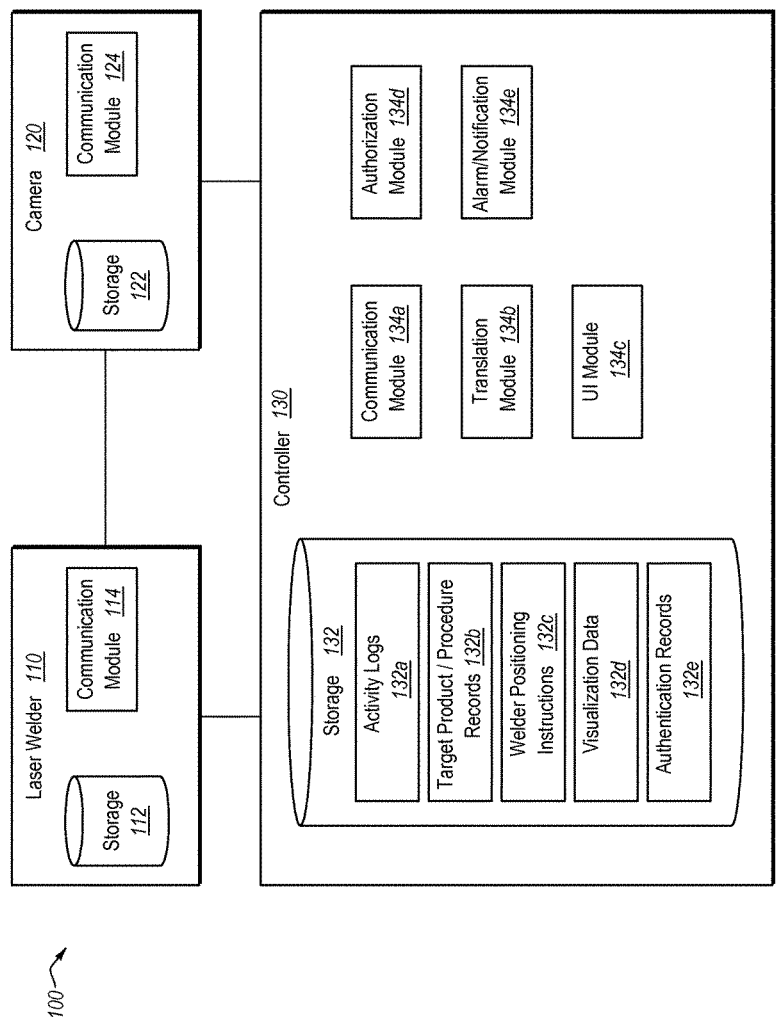
FIG. 2 illustrates a laser welder alignment system according to one embodiment of the present disclosure.

FIG. 2 illustrates one embodiment of a laser welder alignment system 100 in which a target product can be automatically visualized and automatically positioned within a laser welder as part of a laser welding process. The illustrated embodiment includes a laser welder 110, a camera 120 associated with the laser welder 110, and a controller 130 communicatively associated with the laser welder 110 and the camera 120 (e.g., using a Universal Serial Bus (USB) connection or other connection).

The controller 130 includes storage 132, which could include any appropriate form of a database (e.g., relational, flat, etc.). The storage 132 can be used for storing activity logs 132a, product/procedure records 132b, welder positioning instructions 132c, visualization data 132d, and/or authentication records 132e, for example. Activity logs 132a can include records related to laser welder operation time and/or repetition rate, product throughput, product throughput rate, error rate, system settings history, etc.

Product/procedure records 132b can include information related to a product to be welded in the laser welder and/or to processes to which the product is to be subjected to in the laser welder. For example, product/procedure records 132b can include information relating a selected finished product with materials and components to be loaded into the laser welder 110 to make the finished product. Additionally, or alternatively, product/procedure records 132b can include information about laser welding processes (e.g., number, position, and size of welds, duration of welding) required to produce a selected product.

Welder positioning instructions 132c can include instructions capable of being read by the laser welder 110 and which direct the laser welder as to how to position laser welder components (e.g., laser head, collet(s), clamps) and loaded product relative to one another. Visualization data 132d can include data received from camera 120. For example, camera 120 can be configured to capture images of a loaded product as it is positioned within the laser welder 110 and to send the image data to the controller 130. Authentication records 132e can include data related to user identification information, passwords, materials validation codes, log-in information, etc.

The controller 130 can also include a variety of modules, including a communication module 134a enabling the controller 130 to communicate and share data with laser welder 110 and camera 120 (e.g., through communication modules 114 and 124, respectively). Communication module 134a can enable communication by providing application programming interfaces (APIs) or by other communication means.

The controller 130 can also include a translation module 134b configured to translate visualization data 132d stored in storage 132 and/or received from camera 120 into welder positioning instructions 132c suitable for being read by the laser welder 110. For example, the translation module may convert visualization data 132*d* into positioning instructions 132*c* that instruct the laser welder 110 as to how to position a loaded product within the laser welder 110 in order to properly perform a pre-selected process and/or in order to form a pre-selected product.

The controller 130 can also include a user interface module 134*c* configured to present to an operator a user interface for entering, receiving, and/or displaying information related to operation and/or settings of the laser welder 110 and/or the camera 120. For example, the user interface module 134*c* can receive and/or display information (e.g., reference lines, numbers, graphs, indicators) related to settings such as laser power, laser position, product rotation speed, weld distance, etc.

The controller 130 can also include an authorization module 134*d* configured to restrict control of the laser welder 110 and/or camera 120 prior to authorization. For example, an operator may not be able to operate the laser welder 110 and/or camera 120 until suitable identification information is provided (e.g., password, pin, fingerprint scan, key card). Additionally, or alternatively, different operators may have different levels of access to the laser welder 110 and/or camera 120. For example, a first operator may be authorized to operate the laser welder 110 and/or camera 120 according to a pre-defined group of settings, but may not be authorized to alter the settings or choose alternative settings, whereas a second operator may have full authorization to alter settings and/or define authorization parameters. Additionally, or alternatively, some settings and/or processes may only be authorized for certain materials. For example, some settings and/or processes may require pre-entry of a materials validation code, such as a code found on one or more of the product components to be welded.

The controller 130 can also include an alarm/notification module 134*e* configured to send an alarm and/or a notification to an operator under certain circumstances. For example, if a product component misalignment and/or a laser system component alignment cannot be corrected automatically, the alarm/notification module 134*e* can inform the operator (e.g., via user interface displays and/or sounds). Additionally, or alternatively, the alarm/notification module 134*e* can be configured to abort or partially abort an operation upon receiving error information. For example, the alarm/notification module 134*e* can automatically power down the laser and/or halt rotation or other movement of loaded product components upon receiving error information.

The laser welder 110 can include storage 112 and a variety of modules, such as communications module 114. Storage 112 can include information related to laser welder operation, laser welder error triggers, laser welder activity logs, etc. Camera 120 can also include storage 122 and a variety of modules, such as communications module 124. Storage 122 can include information related to camera operation, camera activity logs, camera error triggers, etc.

Though the laser welder alignment system 100 illustrated in FIG. 2 shows certain modules and storage items at certain locations within the system, it will be understood that in other embodiments, certain modules may be moved to other locations, and certain data may be stored in different locations or in more than one location. For example, in some embodiments, one or more storage items and/or modules associated with controller 130 can be stored and processed at laser welder 110. In some embodiments, controller 130 and laser welder 110 share the same processor. In yet other embodiments, controller 130, laser welder 110, and camera 120 share the same processor.

Figure 3:
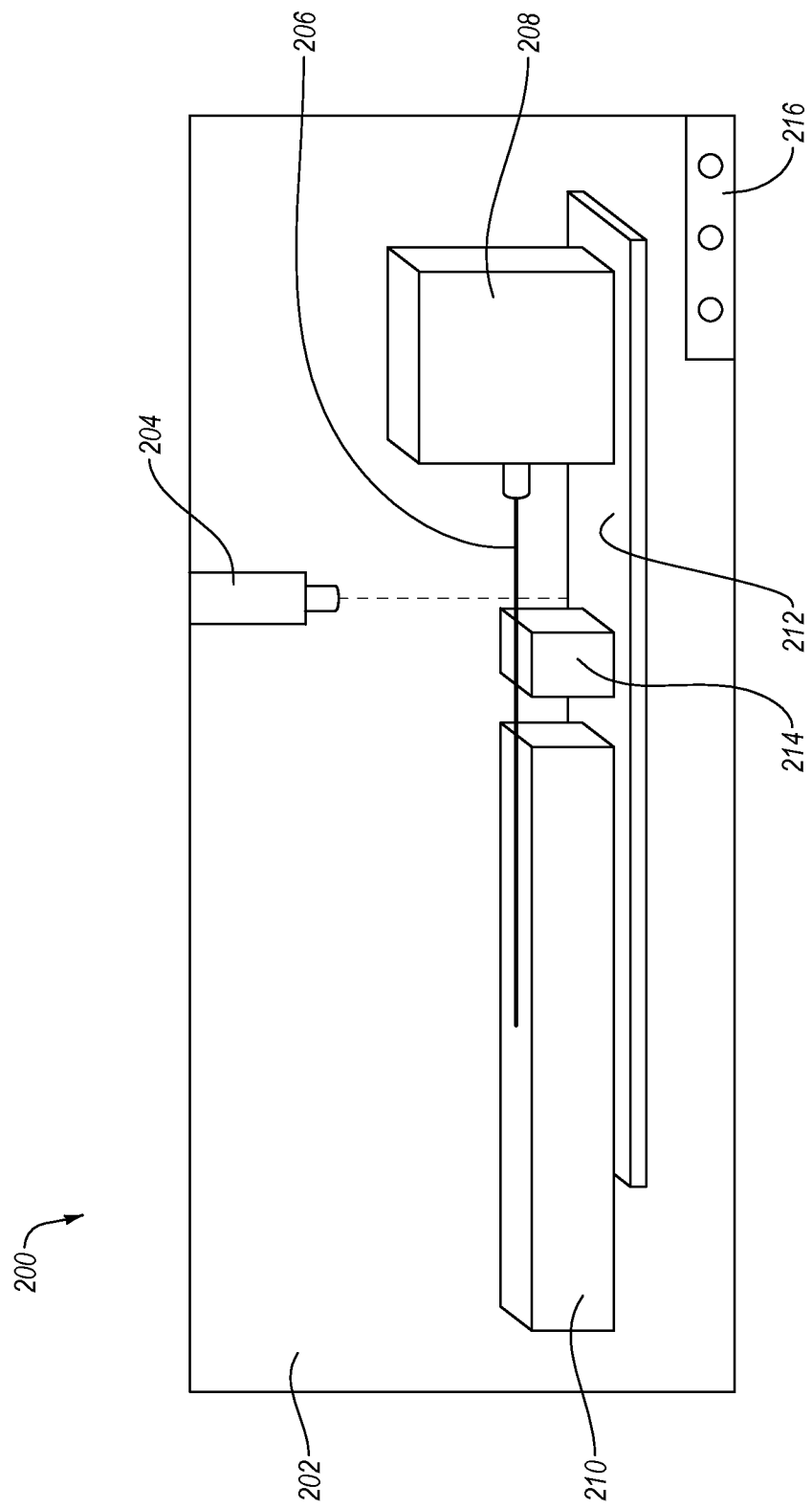
FIG. 3 illustrates a laser welder useful in a laser welder alignment system of the present disclosure.

FIG. 3 illustrates an embodiment of a laser welder 200 according to the present disclosure. In the illustrated embodiment, laser welder 200 includes a lasing area 202 in which a laser head 204 can be located. The illustrated laser welder 200 also includes a rail 212 upon which a collet 208 is positioned, the collet 208 being configured to grip or otherwise hold a loaded product component 206 (which can include, for example, one or more portions to be welded together) within the lasing area 202. Additionally, the collet 208 can be configured to rotate the loaded product component 206 during laser welding processes.

The laser welder 200 can also include a support 210 for supporting another portion of the loaded product component 206. The support 210 can be formed to hold the loaded product component 206, such as by including a grooved or channeled surface in which the loaded product component 206 can lie and rotate. In other embodiments, the support 210 can also be configured to clamp, brace, and/or enclose the loaded product component 206 in order to restrict unwanted movement of the loaded product component 206 while still preferably allowing rotation of the loaded product component 206. Optionally, one or more additional supports, such as additional support 214 can be included to provide additional support and/or bracing to the loaded product component 206.

In the illustrated embodiment, the collet 208, support 210, and additional support 214 are disposed on top of a rail 212. The rail 212 allows movement of the collet 208, support 210, and/or additional support 214 along the longitudinal axis of the rail 212. In preferred embodiments, one or more of the collet 206, support 210, and/or additional support 214 is coupled to a stepper motor (or servo motor or solenoid or other actuator) configured to provide automated movement of the collet 206, support 210, and/or additional support 214 along the rail 212 (e.g., according to welder positioning instructions sent to the laser welder from the controller). For example, one or more of the collet 206, support 210, and/or additional support 214, can be moved along the rail 212 in order to adjust the positional relationship between the laser head 204 and the loaded product component 206. In particular, the loaded product component 206 can be positioned at a proper welding position so that a targeted portion to be welded is aligned with the beam path of the laser head 204.

Additionally, or alternatively, the laser welder 200 can be configured with an adjustable and/or moveable laser head 204. For example, in lieu of or in addition to moving the loaded product component 206 along the rail 212, the laser head 204 can be rotated (e.g., aimed) and/or repositioned in order to bring a targeted portion of the loaded product component 206 into alignment with the beam path of the laser head 204.

The illustrated embodiment includes a rail 212 upon which various components of the laser welder 200 can be positioned and moved upon. In other embodiments, one or more components such as the collet 208, support 210, and/or additional support 214 can be coupled with or positioned at a track, slide, skid, guide, or other means of controlled directional movement, or can be positioned in one or more grooves, channels, and/or grid arrangement, for example.

The laser welder 200 can also include one or more operator controls 216. Operator controls 216 can include buttons, knobs, switches, slides, digital touch-screen objects, and/or other interactable objects associated with one or more of the various components of the laser welder 200 and providing an operator with the ability to control one or more of the various components of the laser welder 200. For example, operator controls 216 can provide an operator with the ability to override pre-selected settings and/or to override automated positioning of the loaded product component 206 resulting from an automated or semi-automated visualization alignment process (as described in detail below). Operator controls 216 can be configured to control, for example, horizontal movement of the collet 208, support 210, and/or additional support 214 along the rail 212, movement and/or aim of the laser head 204, laser operation (power, pulse rate, beam profile, etc.), and/or rotation of loaded product component 206.

Figure 4:
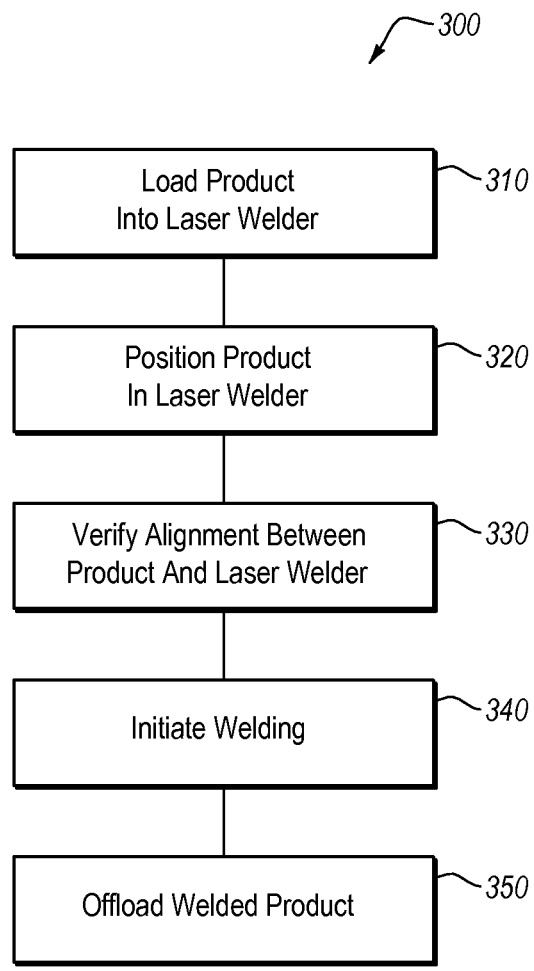
FIG. 4 illustrates an embodiment of a laser welding process.

FIG. 4 illustrates an embodiment of an automated or semi-automated laser welder alignment process 300 using a laser welder alignment system. In the illustrated embodiment, an operator or automated mechanism (e.g., robotic loading mechanism) can load a product into laser welder 310. After the product has been loaded in the laser welder, the laser welder alignment system can position the product in the laser welder 320. Positioning is preferably performed in an automated fashion (e.g., without requiring operator involvement) by using visualization data obtained from a camera (such as camera 120 illustrated in FIG. 2), and includes, for example, moving the loaded product into a correct position and orientation within the laser welder in order to perform a desired welding procedure on the loaded product. In some embodiments, the act of positioning the product in the laser welder 320 can also include rotating the product at a correct speed and within acceptable wobble tolerances (e.g., an acceptable distance between the longitudinal axis of the loaded product when not rotating and the deviation from this position during rotation) in order to perform a desired welding procedure on the loaded product.

The laser welder alignment system can then verify the alignment between the product and the laser welder 330. This can include verifying the position, orientation, and/or rotation of the loaded product, and can also include verification of other components and settings of the laser welder, such as the laser head orientation and/or any movement of components along the rail of the laser welder. Upon verification, the laser welder alignment system can initiate welding 340 of the product, after which an operator and/or automated mechanism can offload the welded product 350.

Figure 5:
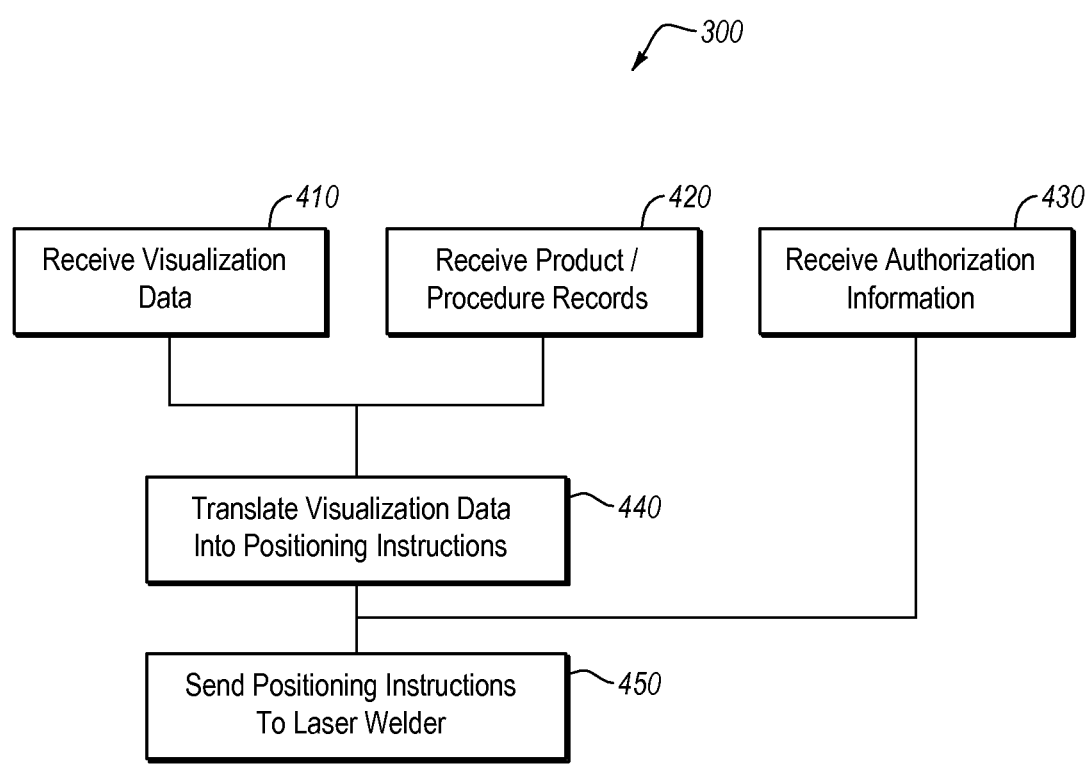
FIG. 5 illustrates an embodiment of formulating laser welder positioning instructions.

FIG. 5 illustrates an embodiment of a process 400 of receiving visualization data, translating the visualization data into positioning instructions, and sending the positioning instructions to a laser welder. The illustrated embodiment can be used as part of process 300 illustrated in FIG. 4. For example, the step of positioning a product in the laser welder 320 can be accomplished using the process 400 illustrated in FIG. 5. In the illustrated process 400, a controller (such as controller 130 illustrated in FIG. 2) can receive visualization data 410. The visualization data can be received from a camera (such as camera 120 illustrated in FIG. 2). For example, after a product has been loaded into a laser welder, the camera can capture images showing the position, orientation, and/or rotation of the loaded product within the laser welder, and the camera can send this visualization data to the controller.

Upon receiving visualization data, the controller can translate the visualization data into positioning instructions 440. For example, the controller can convert information received from the camera into instructions readable by the laser welder directing the laser welder to adjust or maintain the positions of one or more moveable laser welder components. For instance, the controller can formulate instructions for actuating a stepper motor to move a collet along a rail of the laser welder in order to adjust the horizontal position of the loaded product within the laser welder, or the controller can formulate instructions for adjusting a rotation speed of the loaded product within the laser welder. Upon translating visualization data into positioning instructions 440, the controller can send the positioning instructions to the laser welder 450.

In some embodiments, the controller can also receive product/procedure records 420 prior to translating visualization data into positioning instructions 440. For example, an operator may input into the controller a selected product and/or process for which the laser welder is to manufacture and/or perform. The controller can then relate this information with the visualization data received from the camera in order to formulate proper positioning instructions based on the selected product and/or process. For example, the controller may interpret and translate the received visualization data according to a first set of rules for a first selected product and/or process, and may interpret and translate the received visualization data according to a second, different set of rules for a second selected product and/or process.

In some embodiments, the controller can also receive authorization information 430 prior to sending positioning instructions to the laser welder 450. For example, the controller can be configured to prevent the operation of the laser welder until an operator has entered authorization information (e.g., password, pin, fingerprint scan, keycard scan, etc.). In some embodiments, the controller can require authorization prior to translating visualization data into positioning instructions 440 or before receiving visualization data 410 and/or receiving product/procedure records 420.

Figure 6:
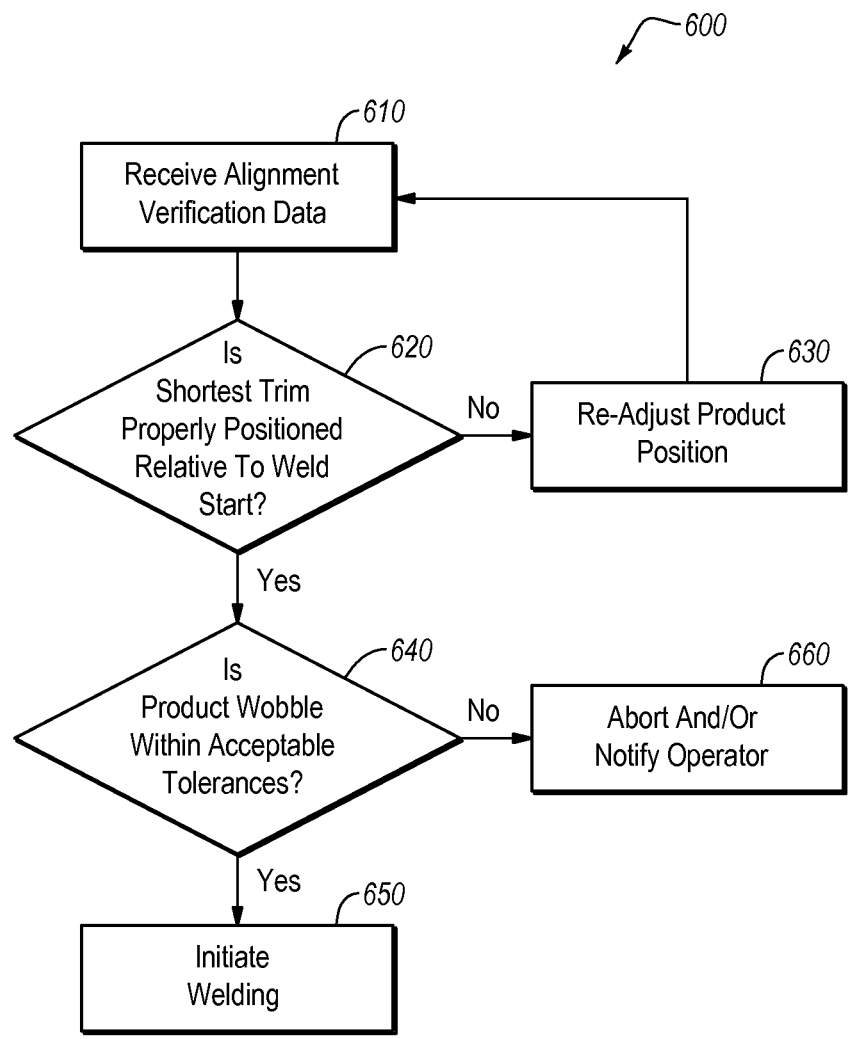
FIG. 6 illustrates an embodiment of a process of verifying product positioning within a laser welder.

FIG. 6 illustrates an embodiment of a process 600 of verifying alignment between a loaded product and a laser welder. The illustrated embodiment can be used as part of process 300 illustrated in FIG. 4. For example, the step of verifying alignment between product and laser welder 330 can be accomplished using the process 600 illustrated in FIG. 6. As illustrated in FIG. 6, a controller can receive alignment verification data 610. Such alignment verification data can include visualization data from a camera (such as camera 120 illustrated in FIG. 2). The controller can then determine if the shortest trim is properly positioned relative to a weld start 620. If the shortest trim and weld start are not properly positioned relative to each other, the controller can re-adjust the product position 630 (e.g., by formulating and sending additional positioning instructions to the laser welder as in the process illustrated by FIG. 5).

If the controller determines that the shortest trim and the weld start are properly positioned relative to each other, the controller can then determine if the product wobble is within acceptable tolerances 640. For example, the controller can receive visualization data from the camera and compare the visualization data to one or more pre-selected wobble tolerance settings to determine whether the loaded product has a wobble that is within the pre-selected tolerances during rotation. The controller can determine, for example, the distance between the longitudinal axis of the loaded product when not rotating and the deviation from this position during rotation and can compare this distance to a pre-selected wobble limit.

If the wobble of the loaded product during rotation is within acceptable tolerances, the controller can proceed to initiate welding 650. If the controller determines that the product wobble is not within acceptable tolerances, the controller can abort and/or notify the operator 660. For example, the controller can be configured to automatically cease operation of one or more components of the laser welder, such as by ceasing rotation, powering down the laser, and/or unloading the product from the laser welder. Additionally, or alternatively, the controller can be configured to sound and/or display an alarm or notification. For example, a user interface can signal to an operator (e.g., through sounds and/or notifications) that the current operation has been ceased and requires operator attention.

The terms "approximately," "about," and "substantially" as used herein represent an amount or condition close to the stated amount or condition that still performs a desired function or achieves a desired result. For example, the terms "approximately," "about," and "substantially" may refer to an amount that deviates by less than 10% from, by less than 1% from, by less than 0.1% from, or by less than 0.01% from a stated amount. In addition, unless expressly described otherwise, all amounts (e.g., temperature amounts, angle measurements, dimensions measurements, etc.) are to be interpreted as being "approximately," "about," and/or "substantially" the stated amount, regardless of whether the terms "approximately," "about," and/or "substantially."

Additionally, elements described in relation to any embodiment depicted and/or described herein may be combinable with elements described in relation to any other embodiment depicted and/or described herein. For example, any element described in relation to an embodiment depicted in FIGS. 1 to 3 may be combinable with an embodiment described in relation to an embodiment depicted in FIGS. 4-6.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A laser welder alignment system, comprising:
   a laser welder;
   a camera associated with the laser welder and configured to capture visualization data from the laser welder; and
   a controller in communicative association with the laser welder and the camera, the controller being configured to receive visualization data from the camera, translate the visualization data into positioning instructions readable by the laser welder at least by identifying a shortest trim of an overlapping portion of the loaded product, and send the positioning instructions to the laser welder, the positioning instructions instructing the laser welder to position a loaded product within the laser welder at a proper welding position relative to the identified shortest trim of the overlapping portion.

2. The system of claim 1, wherein the proper welding position is substantially aligned with the identified shortest trim of the overlapping portion.

3. The system of claim 1, wherein the controller is further configured to verify alignment of the loaded product within the laser welder by receiving alignment verification data from the camera and, based on the alignment verification data, determine whether the loaded product is positioned at the proper welding position.

4. The system of claim 1, wherein the controller is further configured to send one or more re-adjustment or maintain position instructions to the laser welder in response to determining whether the loaded product is positioned at the proper welding position.

5. The system of claim 1, wherein the controller is further configured to verify proper rotation of the loaded product by receiving alignment verification data from the camera and, based on the alignment verification data, determine whether the loaded product has a wobble that is within a pre-defined tolerance range.

6. The system of claim 5, wherein the controller is further configured to send one or more abort or operator notification instructions in response to determining whether the loaded product has a wobble that is within a pre-defined tolerance range.

7. The system of claim 1, wherein the controller is further configured to receive one or more product records identifying the loaded product and to relate the one or more product records to the visualization data to form the positioning instructions.

8. The system of claim 1, wherein the controller is further configured to receive one or more process records identifying a desired laser welding process for which the laser welder is to perform and to relate the one or more process records to the visualization data to form the positioning instructions.

9. The system of claim 1, wherein the controller is further configured to receive authorization information prior to sending positioning instructions to the laser welder, the authorization information identifying that a requested operation is authorized.

10. A laser welder alignment system, the system comprising:
    a laser welder having a plurality of laser welder components;
    a camera associated with the laser welder and configured to capture visualization data from the laser welder; and
    a controller in communicative association with the laser welder and the camera, the controller being configured to receive visualization data from the camera, translate the visualization data into positioning instructions readable by the laser welder at least by identifying a shortest trim of an overlapping portion of the loaded product, and send the positioning instructions to the laser welder, the positioning instructions instructing the laser welder to align the loaded product at the proper welding position relative to the identified shortest trim of the overlapping portion;
    wherein the controller is also configured to verify alignment and proper rotation of the loaded product by receiving alignment verification data from the camera and, based on the alignment verification data, determine whether the loaded product is positioned at the proper welding position and has a wobble that is within a pre-defined tolerance range.

11. A method, implemented at a computer system that includes one or more processors, the computer system being communicatively coupled to a laser welder and a camera, of positioning a weldable product within a laser welder, the method comprising:
    receiving visualization data from a camera, the visualization data representing images of a loaded product within the laser welder;
    based on the visualization data received from the camera, formulating positioning instructions based at least on an identified shortest trim of an overlapping portion of the loaded product; and
    sending the positioning instructions to the laser welder, the positioning instructions instructing the laser welder how to position one or more laser welder components so as to align the loaded product at a proper welding position relative to the identified shortest trim.

12. The method of claim 11, further comprising receiving one or more product records, the one or more product records identifying the loaded product, and relating the one or more product records to the visualization data to form the positioning instructions.

13. The method of claim 11, further comprising receiving one or more process records, the one or more process records identifying a desired laser welding process for which the laser welder is to perform, and relating the one or more process records to the visualization data to form the positioning instructions.

14. The method of claim 11, further comprising receiving authorization information prior to sending positioning instructions to the laser welder, the authorization information identifying that a requested operation is authorized.

15. The method of claim 14, wherein the authorization information includes one or more of a password, fingerprint scan, pin, product code, or key scan.

16. The method of claim 11, wherein the proper welding position is substantially aligned with the identified shortest trim of the overlapping portion.

17. The method of claim 11, further comprising verifying alignment between the loaded product and the laser welder components by receiving alignment verification data from the camera and, based on the alignment verification data, determining whether the loaded product is positioned at the proper welding position.

18. The method of claim 17, further comprising, in response to the determining whether the loaded product is positioned at the proper welding position, sending one or more re-adjustment or maintain position instructions to the laser welder.

19. The method of claim 11, further comprising verifying proper rotation of the loaded product by receiving alignment verification data from the camera and, based on the alignment verification data, determining whether the loaded product has a wobble that is within a pre-defined tolerance range.

20. The method of claim 19, further comprising, in response to the determining whether the loaded product has a wobble that is within a pre-defined tolerance, sending one or more abort or operator notification instructions.

* * * * *